United States Patent [19]

Siepe-Noll

[11] Patent Number: 5,740,993
[45] Date of Patent: Apr. 21, 1998

[54] VEHICLE DOOR WITH SEPARABLE COLLISION PROTECTOR

[75] Inventor: Wolfgang Siepe-Noll, Pulheim, Germany

[73] Assignee: Steyr-Daimler-Puch AG, Vienna, Austria

[21] Appl. No.: 722,166

[22] PCT Filed: Apr. 6, 1995

[86] PCT No.: PCT/AT95/00070

§ 371 Date: Oct. 15, 1995

§ 102(e) Date: Oct. 15, 1995

[87] PCT Pub. No.: WO95/28295

PCT Pub. Date: Oct. 26, 1995

[30] Foreign Application Priority Data

Apr. 15, 1994 [DE] Germany ............ 44 12 935.1
Apr. 17, 1994 [DE] Germany ............ 44 13 022.8
Oct. 18, 1994 [DE] Germany ............ 44 37 219.1

[51] Int. Cl.[6] .................................................. B60J 5/04
[52] U.S. Cl. ............................ 296/146.6; 296/188
[58] Field of Search ........................ 396/188, 189, 396/146.5, 146.6; 49/501, 502

[56] References Cited

U.S. PATENT DOCUMENTS 4,307,911 12/1981 Pavlik ......................... 296/188
4,917,433 4/1990 Tomforde .................. 296/146.6 X
4,958,884 9/1990 Gold .............................. 296/188
5,033,236 7/1991 Szerdahelyi et al. ......... 296/188 X
5,102,163 4/1992 Ishikawa ..................... 296/188 X
5,224,752 7/1993 Marshall ..................... 296/188 X
5,255,953 10/1993 Frank .......................... 296/188 X
5,314,228 5/1994 Figge, Sr. .................... 296/146.6
5,325,632 7/1994 Djavairian et al. .......... 296/146.6 X
5,577,794 11/1996 Gandhi et al. ............... 296/146.6
5,580,119 12/1996 Uchida et al. ............... 296/188 X
5,580,120 12/1996 Nees et al. .................. 296/146.6
5,588,692 12/1996 Gandhi et al. .............. 296/146.6 X

FOREIGN PATENT DOCUMENTS 402070522 3/1990 Japan ....................... 296/146.6

Primary Examiner—Joseph D. Pape
Attorney, Agent, or Firm—Karl Hormann

[57] ABSTRACT

A vehicle door having a longitudinally oriented collision-protection body extending from a forward (4) to a rear door post (5) of the vehicle, the ends of which are designed to abut on the door posts in case of a collision and which in a collision do not penetrate into the interior of the vehicle, which door may be opened with little effort after a collision for rescuing passengers. For this purpose, the collision-protection body (11) is structured as a structural unit releasably connected with the door (10) and in vertical section laterally of the direction of movement forming part of the door contour (12) so that in case of a collision the vehicle door (10) may be opened and the collision-protection body (11;50) may remain in the door opening (1).

18 Claims, 5 Drawing Sheets

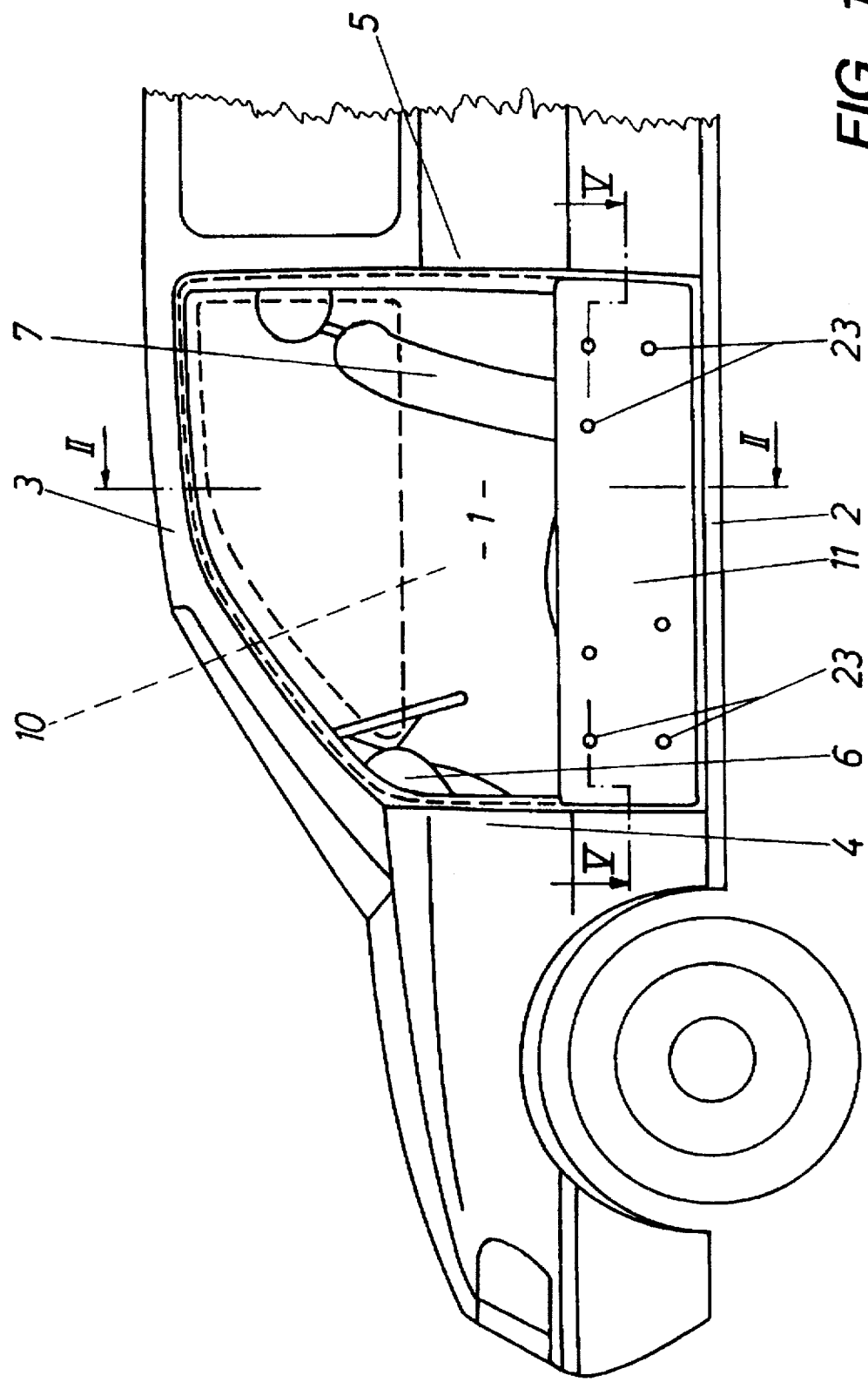

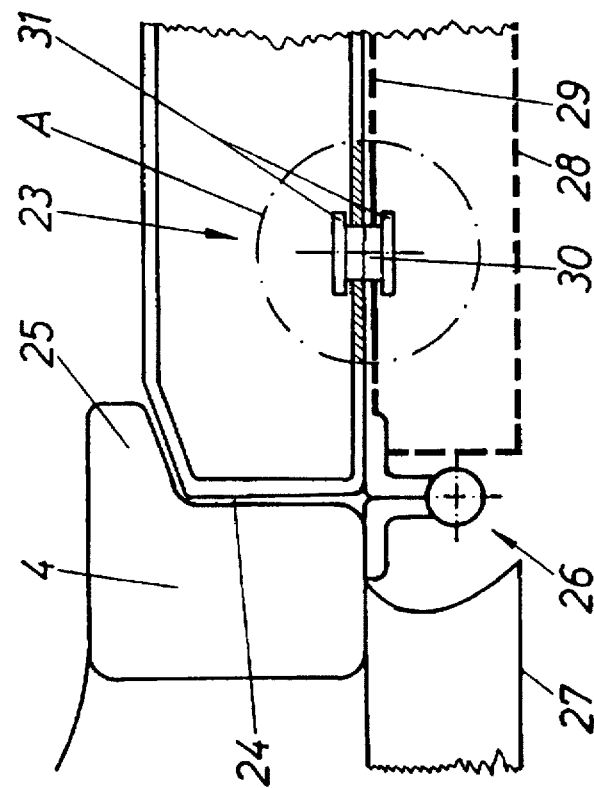
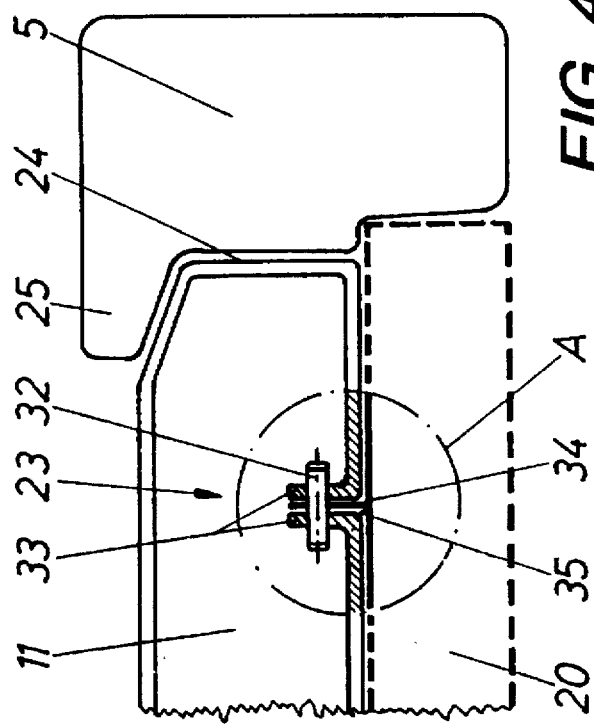
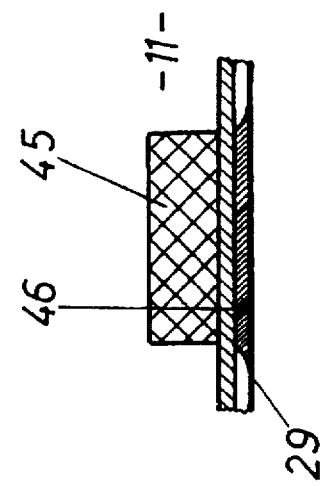

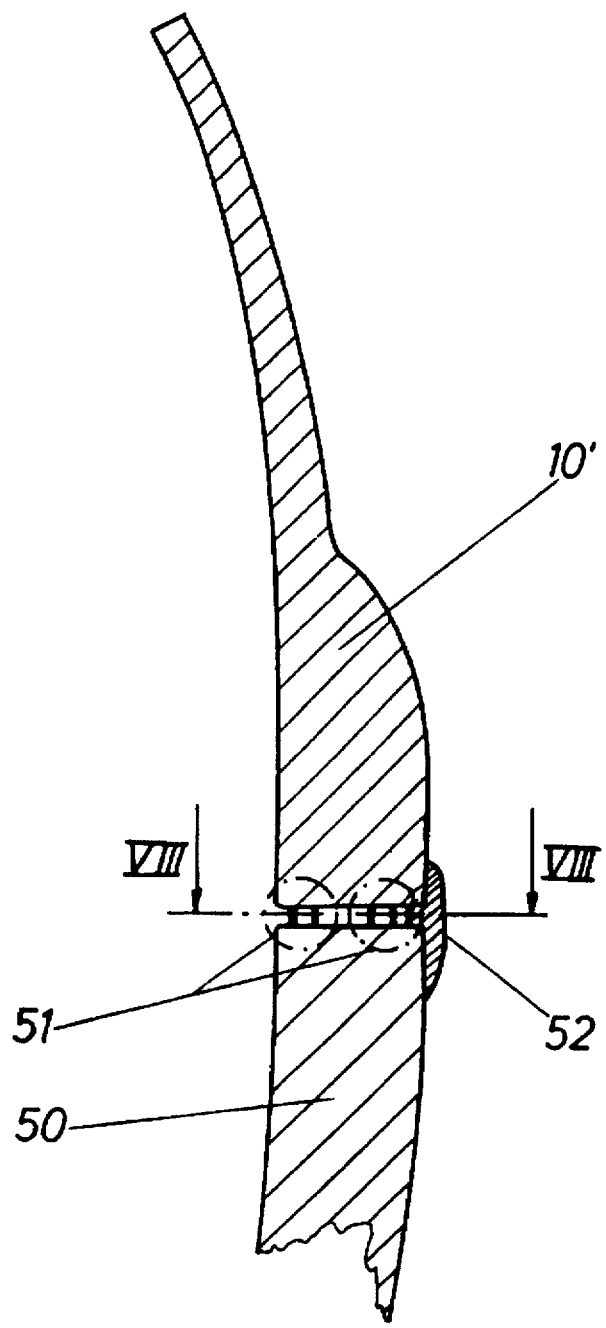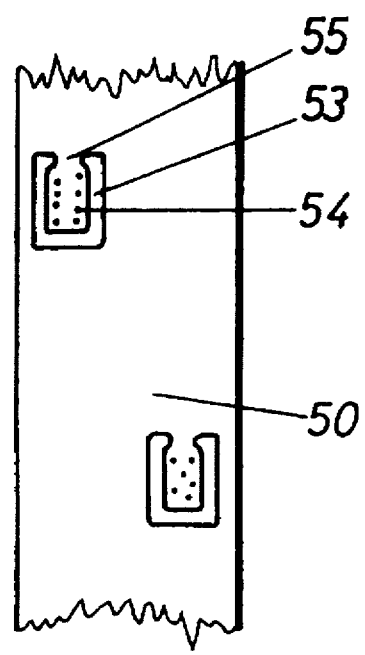
*FIG. 7* *FIG. 8*

VEHICLE DOOR WITH SEPARABLE COLLISION PROTECTOR

BACKGROUND OF THE INVENTION

1. Field of the Invention

The invention relates to a vehicle door with a longitudinally oriented collision-protection body which extends from a forward to a rear door post and the ends of which will be supported by the door posts in case of a collision.

2. The Prior Art

According to the state of the art, such collision-protection bodies are rigidly mounted into the interior space of the door as an integral component thereof and are constituted, for example, as tubes, folded steel profiles or other shaped elements which in case of a force laterally impacting the door absorb kinetic energy by elastic or plastic deformation for the protection of passengers. In some instances they are also adapted, in case of a collision in the forward section of the vehicle, to transmit longitudinal forces from the front door post to the rear door post in order to limit the deformation of the passenger cabin in the region of the dashboard, as well as in the forward roof structure and the rocker panel or door sill. They can only fulfill these requirements, if deflection of the door into the interior of the vehicle is also prevented. To this end, the door posts, on their side facing the interior of the vehicle, are provided with shoulders protruding into the door opening and the collision-protection bodies are often configured such that in case of a collision they are supported on the door posts of the vehicle body.

Collision-protection bodies are known from German patent specifications DE-C 22 15 674 and DE-A 41 25 299 the ends of which under the effect of a lateral impact will protrude from the door and engage, or penetrate into, the door posts. In the first place, this is disadvantageous because of the fact that in case of a deformation of the car body, these components will penetrate, or be jammed, into the door frame with such a force that after an accident the door can be opened either only by very large forces and mechanical tools or usually not at all.

A further disadvantage of such elements resides in the fact that as a single longitudinally disposed profile strip their effectiveness in a frontal collision is limited, and that, if at all, they can reinforce the door post at one point only, which is insufficient. Because of this they can prevent neither a parallelogrammic deformation of the door in its plane, nor an upward bending of the rocker panel or door sill and of the roof beam, thus also resulting in the door being jammed to the door opening, in case of a frontal collision. Such conditions are particularly disadvantageous in convertibles since they are not provided with a roof beam.

A further disadvantage common to all reinforcements rigidly fitted into the interior of a door is that they complicate production and assembly of the door, not least because other functional components have also to be fitted and mounted within the interior of the door.

OBJECT OF THE INVENTION

It is, therefore, an object of the invention with simple means to construct a vehicle door in such a way that while in case of a frontal collision it will reinforce the vehicle body without penetrating into the interior of the vehicle, the door may yet be opened with little effort after a collision to permit rescuing any passengers.

SUMMARY OF THE INVENTION

In accordance with the invention this is accomplished by a collision-protection body structured as a unit releasably connected to the door and constituting, in vertical section normal to the direction of travel, a part of the contour of the door, so that in case of a collision the door of the vehicle may be opened and the collision-protection body may remain in the door opening.

As part of the door contour, the collision-protection body may in both directions be formed with considerable cross sectional dimensions, so that it will provide for an omnidirectionally effective reinforcement of the door and of the body of the car, as well as a frictional connection between door and door posts capable of absorbing impacts of the kind resulting in deformation. In this fashion, it will on the one hand lend protection in leg and pelvic areas of any passengers, and, on the other hand, the door may be severed from it, so that after a collision, the rigid and usually jammed part of the door, i.e. the collision protection body, will remain within the door opening, while the light part of the vehicle door may be opened to rescue any passengers across the protection body from the interior of the vehicle.

Furthermore, the division into two components which together make up in the contour of the door, results in a simplification of production. The collision-protection body need not be mounted to a part of the door which is difficult to access; rather, as a preassembled unit it is simply connected to the door which itself then may be a substantially simplified structural component.

Since because of the separability of the two components, the never completely satisfied requirement that a door remain openable after a collision, can now be dropped, the collision-protection body may preferably be structured as a box, the front and rear surfaces of which abut against the front door post and the rear door post. Because of this, it may be dimensioned particularly generously and be provided with a sufficient number of anchoring members for penetration into the door posts. By virtue of its engagement with the door posts, it can divert strong lateral forces into the door posts and transmit large as well as vertically directed forces from the forward door post to the rear door post, thus also counteracting any parallelogrammic deformation of the door opening. In the last-mentioned manner it also reinforces the body of a car in case of a frontal collision. Because of its larger surface area, its protective effect can be maximized in case of a lateral collision.

It is within the scope of the invention to extend the collision-protection body down to the lower margin of the door opening and at its front surface—in the direction of travel—to provide a hinge fastened to the door post. In such a structure a second hinge is arranged on the light part of the door. In that manner, the releasable connection between door and collision-protection body is relieved, and by way of the hinge a direct connection is provided between the collision-protection body and the door post. The collision-protection body extending down to the rocker panel or door sill is thus also supported inwardly by the rocker panel which results in increased rigidity of the entire structure.

In a preferred embodiment, the collision-protection body is arranged at the side of the door facing the vehicle cabin. The door panel thus overlaps the collision-protection body on its outer side, providing a large vertical surface for the separable connection and preserving the outer appearance of the vehicle. In addition, parts of the window hoisting mechanism have to be mounted within the overlapping portion.

In another advantageous embodiment, the collision-protection body constitutes the entire lower part of the door. In this manner, the entire depth or thickness of the door is available to accommodate the cross-section of the collision-protection body and the connecting surface or interface between the two componets constituting the entire door structure may at least in part be arranged horizontally, so that they may be connected at a more easily accessible position.

In a further improvement of the invention, connectors are provided for connecting the collision-protection body to the door panel, which connectors will break or tear off in case of a collision and release the connection between the door panel and the collision-protection body made. Such connectors may be sufficiently strongly so as not to break when opening and closing the door and during driving operation, but to be broken or torn in case of a deformation of the exterior door panel. Preferably, these connectors are made from a brittle material which breaks when subjected to shear forces. The brittle material may be metallic or ceramic, it being of advantage that the shear strength is precisely defined and that the brittle material fractures without prior creep. Hence, these components should be manufactured with substantially uniform shear strength.

In an other improvement of the invention, the connectors are pegs protruding from one of the components and inserted in elastic sleeves mounted in recesses in the other component. Because of the elastic connection, the sleeves may accommodate dislocations and tilting so that the pegs cannot become stuck within the sleeves. In this manner, the pegs may more easily be pulled out of the sleeves during or after a collision.

In yet another improvement, the door and the collision-protection body are connected to each other by way of predetermined breakable connections formed at either of the two components. This kind of connection is particularly simple and cheap as the two components may be conventionally connected to each other by spot-welding and still provide for the separability in accordance with the invention.

In still another improvement of the invention, magnets are provided at one of the two components for connecting the collision-protection body to the door panel, which magnets cooperate with correspondingly shaped surface areas of the other component. Provided the contact surfaces are sufficiently dimensioned and appropriately shaped, a connection may thus also be established which posses the requisite holding force, which will be released upon a change in the relative positions of the magnet and contact surface as a result of a deformation. Suitable magnets are either permanent magnets or electrically activated magnets which may be deactivated by an electronic control in case of a collision.

The invention will hereinafter be described and elucidated with reference to drawings, in which:

FIG. 1 is a partial side view of a motor vehicle with a first embodiment of a door according to the invention;

FIG. 4 is a section along line IV—IV in FIG. 1 enlarged;

FIG. 5 depicts a variation of detail A of FIG. 4;

FIG. 6 is a further variant of the detail of FIG. 4 enlarged;

FIG. 7 is a cross-section of a second embodiment of a door in accordance with the invention;

FIG. 8 is a horizontal section along line VIII—VIII in FIG. 7.

Figure 2B:
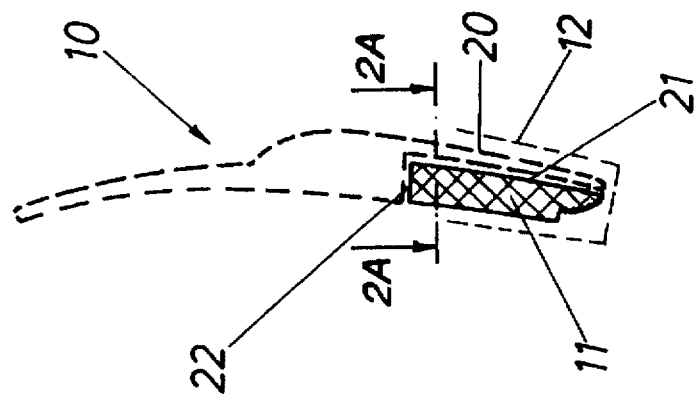
FIG. 2 is a cross-section along line II—II in FIG. 1.
Figure 2A:
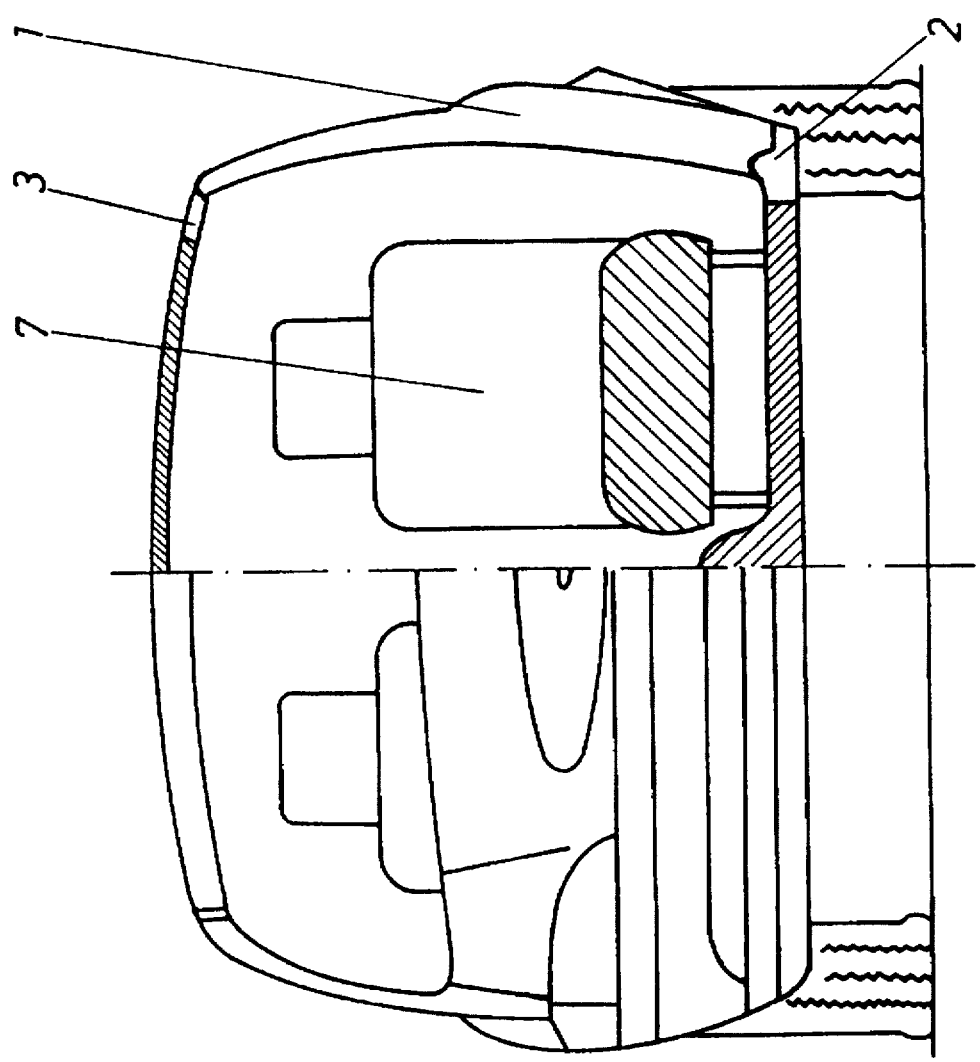

FIGS. 1 and 2 show a first embodiment of a front door in accordance with the invention, but it is equally applicable to a rear door. A door opening 1 of a motor vehicle composed of a rocker panel or door sill 2 forming the nether margin, a roof beam 3, a forward door post 4 and a rear door post 5. In the interior of the vehicle, a dashboard 6 and a driver's seat 7 may be discerned. In FIG. 2 a door 10 fitting into the door opening 1 is shown removed from the door opening 1 for the sake of clamity, and in FIGS. 1 and 2, the door has been shown in dashed lines. A collision-protection body 11 is provided in the lower portion of the door opening 1 and extends from about the pelvic area of a driver down to the rocker panel door sill 2 and together with the door 10 forms a door structure 12. A portion 20 of the door 10 overlapping the collision-protection body 11 also extends down to the rocker panel 2. A vertical contact surface 21 and a horizontal contact surface 22 are provided between portion 20 of the door 10 and the collision-protection body 11. In FIG. 1, the collision-protection body 11 is shown with the door in its closed condition, and connecting sites 23 are indicated at which the collision-protection body 11 is connected to the overlapping part 20 of the door 10, in a manner to be described.

Figure 3:
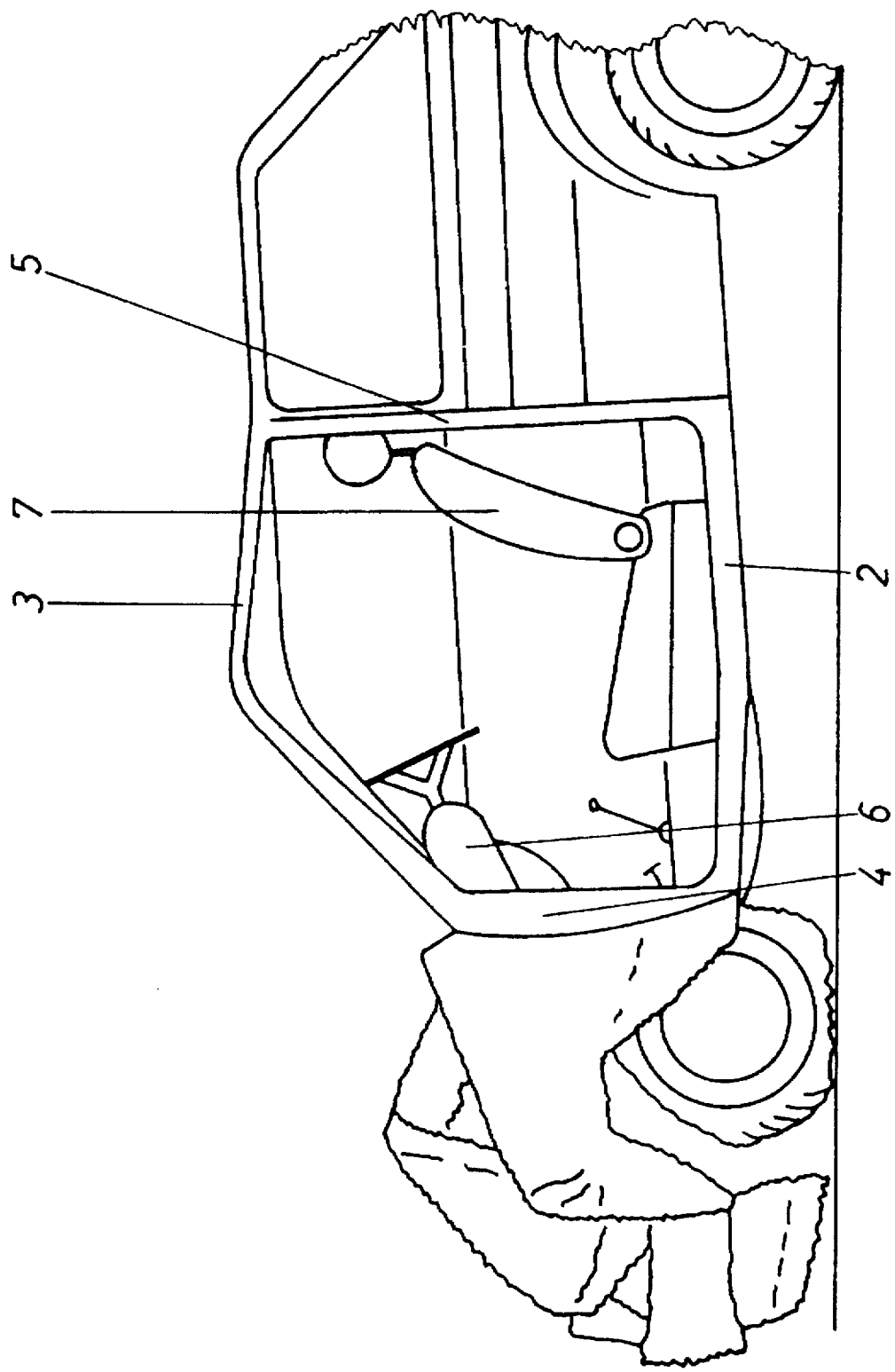
FIG. 3 depicts a state of the art motor vehicle after a collision.

FIG. 3 shows a motor vehicle according to the state of the art for purposes of explaining the parallelogramic deformation of the door opening. Since the rocker panel 2 and the roof beam 3 have been bent upwardly in consequence of a frontal collision the forward door post 4 has been dislodged relative to the rear door post 5 parallelogrammically in an upward and rearward direction. The invention also aims at counteracting this pattern of deformation.

From the horizontal section of the collision-protection body 11 shown in FIG. 4, it can be seen that it is a box the front and rear surfaces 24 of which abut against the front door post 4 and the rear door post 5, respectively. As indicated by their cross-sectional presentation the door posts 4, 5 are provided with protruding portions 25 extending into the door opening which prevent the collision-protection body 11 from penetrating into the interior of the vehicle. The abutment of its front and rear surfaces 24 over their entire height against the posts 4, 5 results in counteracting against any parallelogrammic deformation of the two door posts 4 5 against each other.

The box-shaped collision-protection body 11 is only depicted by its general outer contour. It may comprise elongate profiles of various kinds and/or other energy-absorbing or shock-absorbing devices, bodies or fillers. The collision-protection body may also comprise devices which in a collision are projected out of the forward and rear surfaces thus to arrest it in, or even joining it with, the door frame. For reasons of rigidity, the collision-protection body will in most cases be a generally enclosed box; but for different purposes various openings may be provided at various positions.

In the embodiment shown, the collision-protection body 11 is pivotally mounted on the forward door post 4 by a hinge 26. A second hinge (not shown) is affixed to the upper portion of the door 10 in a conventional manner. The hinge 26 is covered by a vehicle body panel 27 which is flush with the overlapping portion 20 of the door 10. An inner sheet metal web or panel 29 which together with an outer sheet metal web 28 forms the overlapping portion 20 of the door 10 is connected to the collision-protection body 11 at positions 23. Different methods are available for this purpose, two different ones being shown in FIG. 4 for the positions 23. The connecting element near the hinge 26 is a rotationally symmetric shear-member 30 having two collars 31. A wall of the box 11 and the inner panel 29 of the door 10 are clamped between the two collars 31. An intermediate body of sound absorbing material may be provided. The shear member 30 is made of a brittle metallic or ceramic material, which is breaks if the two sheet metal components are moved relative to each other (such movement also taking place by the deflection in a lateral collision).

In another embodiment, shown in FIG. 4, further removed from the hinge 26, the connecting member is a shear-bolt 32 penetrating through bores in metal straps 33 extending from the box 11 and in a metal strap 34 affixed to the inner panel 29 of the door. The metal straps 33 are formed in, or welded to, the interior of the box 11 forming both sides of a slot 35 into which the metal strap 34 is inserted. In a lateral collision the shear bolt 32 will be broken. To this end it may be provided with a notch (not visible).

In a variant according to FIG. 5, a peg 40 is arranged, preferably by welding, on the inner panel 29. The wall of the box section 11 is provided with an annular inwardly drawn flange 43 with a rubber-elastic sleeve 42 provided therein. A bushing 41 is pressed into the sleeve. The peg 40 is inserted into the bushing 41 and secured by a retaining ring 44. The peg 40 is torn out of the bushing 41 during or after a collision. The elastic sleeve prevents jamming between the bushing 41 and the peg 40, so that the peg 40 may always be pulled out of the bushing 41.

In an other variant according to FIG. 6., a magnetic plate 45 is affixed, preferably glued, to the inside of the box 11. Through the wall of the box the magnet acts on a contact plate 46 which is rigidly connected, as by welding, to the inner panel 29 of the door 10. By way of example, the magnet 45 here shown is a permanent magnet. It could instead be electrically energizable and electronically switched off in case of a collision. Furthermore, the contact surfaces need not necessarily be planar; conical shapes could be used which incidentally would facilitate precise positioning. Finally, the unlatching could also be accomplished mechanically, for which purpose a Bowden cable or a linkage would have to be provided which could be actuated either from the exterior or from the interior of the vehicle.

FIG. 7 shows another embodiment of the invention, differing from the first one by the collision-protection body 50 being formed as a box which extends over the entire depth of the door and which in fact constitutes the entire lower portion of the door. At connection spots 51 the collision protection body 50 is connected to the light portion of the door 10'. 52 is a decorative strip serving to improve the appearance by hiding any seam between the collision protection body 50 and the upper portion of the door, and as a seal. Connectors of the kind heretofore described may be provided at the connection points 51. It is also possible at one of the two components to utilize predetermined breaking points of the kind shown in FIG. 8. They may be cuts 53 forming tongues 54 which are bent out of their plane and which are connected to the respective other component by spot-welding. To the component out of which they protrude, the tongues 54 are connected by narrow bridges 55 which constitute the predetermined breaking points. In case of a collision, they will break at a predetermined load and thus release the connection between the box 50 and the door 10'. Such predetermined breaking members may also be utilized at the vertical and horizontal contact surfaces 21, 22 (FIG. 2) of the first embodiment.

It is within the scope of the invention, to deviate in many ways from the described embodiments, and the different elements may be combined in different ways.

What claimed is:

1. A vehicle door adapted to be mounted between first and second spaced-apart door posts of a vehicle, the door comprising:

door panel means;

elongate collision-protection means comprising first and second end surface means adapted in a collision to be arrested against movement between the first and second door posts;

means for releasably connecting the door panel means to the collision-protection means such that when the collision-protection means is arrested between the first and second door posts the door panel means may be moved relative to the collision protection means.

2. The vehicle door of claim 1, wherein the door panel means is of a predetermined contour and the collision-protection means comprises a structural unit configured in vertical section transversely of its elongation to form part of the contour.

3. The vehicle door of claim 1, wherein the collision-protection means is of substantially parallelpiped configuration and the first and second surface means are disposed in close proximity to the first and second door posts, respectively.

4. The vehicle door of claim 1, wherein the collision-protection means at one of its first and second surfaces is affixed to one of the first and second door posts by hinge means and wherein the collision-protection means constitutes at least a portion of a lower section of the vehicle door.

5. The vehicle door of claim 4, wherein the door panel comprises an outside vehicle surface and the collision-protection means is connected to the door panel on its surface opposite the outside surface.

6. The vehicle door of claim 5, wherein the collision-protection means substantially fills the lower surface area of the door panel means.

7. The vehicle door of claim 1, wherein the means for releasably connecting comprises means separating in response to a collision exceeding a predetermined force.

8. The vehicle door of claim 7, wherein the means for releasably connecting comprises a brittle material.

9. The vehicle door of claim 8, wherein the brittle material is metallic.

10. The vehicle door of claim 8, wherein the brittle material is ceramic.

11. The vehicle door of claim 7, wherein the means for releasably connecting comprises permanent magnet means.

12. The vehicle door of claim 7, wherein the means for releasably connecting comprises electromagnetic means adapted to be deenergized upon a collision exceeding a predetermined force.

13. The vehicle door of claim 7, wherein the means for releasably connecting comprises peg means in one of the door panel means and collision-protection means and sleeve means in the other of the door panel means and the collision-protection means.

14. The vehicle door of claim 13, wherein resilient means is provided intermediate the peg means and the sleeve means.

15. The vehicle door of claim 17, wherein the means for releasably connecting comprises a plurality of metallic tongue means provided with means breaking at a predetermined force.

16. The vehicle door of claim 17, wherein the means for releasably connecting comprises shear-bolt means.

17. The vehicle door of claim 1, wherein the door panel means comprises an upper section of the door and wherein the collision-protection means comprises the entire lower section of the door.

18. The vehicle door of claim 17, wherein the upper and lower sections of the door are connected along substantially horizontally disposed surfaces.

* * * * *